3,174,952
TERPOLYMER VINYLACETATE - 2-OXYMETHYL-
1,4 - ENDOMETHYLENE - CYCLOHEXENE - (5)-
ETHYLENE AND PROCESS THEREFOR
Walter Franke, Erwin Heinrich, and Rudolf Müller, Marl,
 Germany, assignors to Chemische Werke Huls Aktien-
 gesellschaft, Marl, Germany, a corporation of Germany
No Drawing. Filed Mar. 7, 1963, Ser. No. 263,394
Claims priority, application Germany, Aug. 31, 1962,
C 27,831
4 Claims. (Cl. 260—80.5)

It is known to prepare hydroxyl group-containing mixed polymerizates of ethylene and vinyl esters by partial saponification of such mixed polymerizates with acids or alkalies in the presence of solvents. However, this method, due to the low solubility of the mixed polymerizates requires large quantities of solvents or diluting agents which must be recovered subsequently by a costly technological procedure.

It has been found that it is possible to prepare hydroxyl group-containing mixed polymerizates of ethylene and vinyl esters in a homogeneous liquid state by the use of radical-forming polymerization catalysts and at elevated temperatures and pressures if mixtures of vinyl esters and 2-hydroxymethyl-1,4 - endomethylene - cyclo-hexene-(5) in weight ratios within the range from 1:1 and 8:1 and preferably within the range from 4:1 to 1:1 are polymerized in the presence of inert solvents in quantities ranging from one to ten times the weight of said monomeric mixture at an ethylene pressure between 300 and 1500 atmospheres, the pressure being kept constant throughout the reaction.

The 2-hydroxymethyl-1,4-endomethylene-cyclo-hexene-(5), employed as hydroxyl group-providing compound, can be prepared easily and with satisfactory yield by Dien synthesis according to Diels-Alder from cyclopentadiene and allyl alcohol. Vinyl acetate is utilized preferably as vinyl ester, but vinyl propionate, vinyl laurate and mixtures of vinyl acetate and vinyl propionate can be employed also.

The polymerization is carried out in a known manner per set in homogeneous liquid phase under increased pressure. Tertiary butylalcohol is particularly suitable as solvent for the monomers, the vinyl ester, the 2-hydroxymethyl-1,4-endomethylene-cyclo-hexene-(5) and the ethylene. Other solvents which will not interfere with the polymerization are aromatic and aliphatic hydrocarbons and ether. The weight ratio of the tertiary butylalcohol to the liquid monomeric mixture of vinyl ester and 2-hydroxymethyl-1,4-endomethylene-cyclo-hexene-(5) ranges, preferably, from 9:1 to 1:1. The weight ratio of vinyl ester 2 - hydroxymethyl-1,4-endomethylene-cyclo-hexene-(5) ranges, preferably, from 4:1 to 1:1. The polymerization can be carried out either in the presence or in the absence of water, the amount of water being kept lower than the amount of tertiary butanol. The presence of water will not alter the constitution of the polymerized product but the yield can be influenced favorably thereby. Soluble radical-forming substances are used as catalysts in the organic phase such as lauroylperoxide, benzoylperoxide or preferably azodiisobutyric acid nitrile. The catalysts are employed in quantities of .1 to 3.0, preferably .3 to 1.5 percent by weight relative to the liquid monomers. The polymerization temperature is 30° to 150° C., preferably 60° to 90° C. The pressure determines the amount of ethylene to be supplied.

Usually, the polymerization is carried out in such a manner that first the liquid monomers, vinyl ester and the 2-hydroxymethyl-1,4-endomethylene-cyclo-hexene-(5) as well as the catalyst are placed in the autoclave and then the ethylene is introduced up to a pressure of 100 atmospheres at room temperature. The temperature is then raised to the desired polymerization temperature and additional ethylene is introduced until a pressure of from 300 to 1500, preferably 400 to 1000 atmospheres is reached. The selected pressure is then maintained throughout the polymerization and any pressure drop caused by the absorption of ethylene is restored to the pre-selected value. The mixing of the polymerization substances is accomplished preferably by stirring but can be accomplished also, if desired, solely by the turbulent flow of the introduced ethylene. The ratio of vinyl ester and 2-hydroxymethyl-1,4-endomethylene - cyclo - hexene-(5) in the polymers formed is determined essentially by the ethylene pressure and the quantity of tertiary butyl-alcohol present, and can be ascertained if necessary by simple preliminary tests. By use of the above given ratios it is possible to prepare hydroxyl group-containing mixed polymerization products with a content of 15 to 25% vinyl acetate and 5 to 25% 2-hydroxymethyl-1,4-endomethylene-cyclo-hexene-(5) which corresponds to a content of approximately .7 to 3.5% of free hydroxyl groups. The hydroxyl group-containing mixed polymerizates have a reduced specific viscosity of .4 to 1.0, measured in p-xylene at 110° C. and a concentration of .3 g./100 cm.$^3$. The hydroxy group-containing mixed polymerizates have an elongation at break of 800 to 1000% and a tensile strength up to 190 kg./cm.$^2$. They can be used for the manufacture of transparent foils and can be linked, in known manner, with polyisocyanates, thereby increasing the tensile strength values still further. The new method permits, in one single processing step, the preparation of hydroxyl group-containing mixed polymerizates from ethylene and vinyl esters with a regulatable content of free hydroxyl groups while in case of the previously known methods an additional complicated saponification process is required.

*Example 1*

In a steel autoclave with a capacity of 2 liters which is provided with an agitator there are placed 300 ml. of tertiary butylalcohol, 80 ml. of water, 150 g. vinylacetate and 100 g. 2-hydroxymethyl - 1,4 - endomethylene - cyclo-hexene-(5). After the addition of 1.5 g. of azodiisobutyronitrile, the atmospheric oxygen is driven out by washing with nitrogen and subsequently by ethylene. Then ethylene at 100 atmospheres' pressure is introduced and the autoclave is heated up to 65° C. within 15 to 25 minutes. After this period of time the ethylene pressure is raised to 600 atmospheres and maintained at this level for 15 hours, during the polymerization. The mixture is then cooled, the excess ethylene drawn off, and the polymerizate is separated by filtration after removal of the mixture from the autoclave. In order to remove completely the unconverted liquid monomers and the tertiary butylalcohol the polymerizate is boiled repeatedly with an acetone-methanol mixture (9:1) and then dried in vacuum at 40° to 50° C. The yield is 160 g. On the basis of the saponification number the vinylacetate content in the polymer is computed at 19%, and on the basis of the oxygen analysis, after making allowance for the oxygen content of the vinylacetate, a 2-hydroxymethyl-1,4-endomethylene-cyclo-hexene-(5) content of 11.5% is computed. The reduced specific viscosity in p-xylene at 110° C. and a concentration of .3 g./100 cm.$^3$ is .6. The copolymerizate has a tensile strength of 89 kg./cm.$^2$ and an elongation at break of 680%.

*Example 2*

In a steel autoclave with a capacity of 2 liters which is provided with an agitator there are placed 700 ml. of tertiary butylalcohol, 40 ml. of water, 150 g. of vinylacetate and 50 g. of 2-hydroxymethyl-1,4-endomethylenecyclo-hexene-(5). After the addition of 2.1 g. of azodiisobutyronitrile the atmospheric oxygen is driven out by washing with ethylene. Then ethylene at 100 atmospheres' pressure is introduced into the autoclave and heated up to 65° to 70° C. within 15 minutes. After this period of time the ethylene pressure is raised to 800 atmospheres and maintained at this level for 20 hours during the polymerization. The autoclave is then cooled, the excess ethylene drawn off, and the polymerizate is isolated in the manner described in Example 1. The yield is 290 g. The polymerizate contains 19.6% of vinylacetate and 6.5% of 2 - hydroxymethyl - 1,4 - endomethylene - cyclo-hexene-(5). The reduced specific viscosity is .76, the tensile strength 145 kg./cm.$^2$ and the elongation at break of 890%.

*Example 3*

The method is identical with the procedure described in Example 2, only the catalyzer quantity being changed. By using .7 g. azodiisobutyronitrile the yield of copolymerizate is 140 g. The polymerizate contains 21.2% of vinylacetate and 3.7% 2-hydroxymethyl-1,4-endomethylene - cyclo - hexene - (5). The tensile strength is 177 kg./cm.$^2$ and the elongation at break of 900%.

We claim:
1. Process for the preparation of a hydroxyl group-containing mixed polymerizate of ethylene and a vinyl ester in homogeneous liquid state which comprises heating a mixture of
    (1) 2-hydroxymethyl-1,4-endomethylene-cyclo-hexene-(5),
    (2) a vinyl ester selected from the group consisting of vinyl acetate, vinyl propionate, vinyl laurate and mixtures of vinyl acetate and vinyl propionate in a weight ratio between 1:1 and 1:8,
    (3) an inert solvent in an amount by weight within the range from one to ten times of the amount by weight of said monomers and
    (4) a radical forming polymerization catalyst selected from the group consisting of lauroylperoxide, azodiisobutyric acid nitrile and benzoylperoxide, to a temperature within the range from 30 to 150° C. while maintaining an ethylene pressure on said mixture of from 300 to 1500 atmospheres, this pressure being kept substantially constant throughout the duration of the polymerization reaction.
2. Process according to claim 1 in which the vinyl ester is acetate.
3. Process as defined in claim 1 in which the weight ratio of vinyl ester to 2-hydroxymethyl-1,4-endomethylene-cyclo-hexene-(5) is within the range from 4:1 to 1:1.
4. As a new product a copolymer of from 15 to 25% of vinylacetate, 5 to 25% of 2-hydroxymethyl-1,4-endomethylene-cyclo-hexene-(5) and from 50 to 80% of ethylene, having from 0.7 to 3.5% of free hydroxyl groups.

References Cited in the file of this patent
UNITED STATES PATENTS

| | | |
|---|---|---|
| 2,396,785 | Hanford | Mar. 19, 1946 |
| 3,076,793 | Heinrich et al. | Feb. 5, 1963 |

OTHER REFERENCES

Hackh's Chemical Dictionary, p. 607, McGraw-Hill, N.Y. (1944).